(12) United States Patent
Hackenbuchner et al.

(10) Patent No.: US 7,453,213 B2
(45) Date of Patent: Nov. 18, 2008

(54) HIGH-PRESSURE DISCHARGE LAMP AND ILLUMINATION APPARATUS HAVING A HIGH-PRESSURE DISCHARGE LAMP

(75) Inventors: Stefan Hackenbuchner, Munich (DE); Gunther Hirschmann, Munich (DE); Frank Sroka, Berlin (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 0 days.

(21) Appl. No.: 11/289,430

(22) Filed: Nov. 30, 2005

(65) Prior Publication Data

US 2006/0119282 A1   Jun. 8, 2006

(30) Foreign Application Priority Data

Dec. 6, 2004   (DE) .................. 10 2004 058 881

(51) Int. Cl.
   *H01J 13/46*   (2006.01)
(52) U.S. Cl. .................. 315/56; 315/77; 315/82
(58) Field of Classification Search .................. 315/77, 315/82, 56, 57, 70, 76, 219, 209 R; 307/10.1, 307/10.8
   See application file for complete search history.

(56) References Cited

U.S. PATENT DOCUMENTS

| | | | | |
|---|---|---|---|---|
| 5,270,610 A | * | 12/1993 | Schoenherr et al. | 313/318.01 |
| 5,654,609 A | * | 8/1997 | Smallwood et al. | 315/56 |
| 5,828,174 A | * | 10/1998 | Seiler et al. | 315/62 |
| 6,066,921 A | * | 5/2000 | Nakamura et al. | 315/71 |
| 6,084,354 A | * | 7/2000 | Kohmura et al. | 315/57 |
| 6,462,476 B1 | * | 10/2002 | Hirschmann et al. | 315/58 |
| 6,701,076 B2 | | 3/2004 | Tsai | 396/144 |
| 6,731,076 B1 | * | 5/2004 | Gerhard et al. | 315/289 |
| 7,135,822 B2 | * | 11/2006 | Behr et al. | 315/57 |
| 2004/0114389 A1 | * | 6/2004 | Yokoi et al. | 362/523 |

FOREIGN PATENT DOCUMENTS

| | | |
|---|---|---|
| DE | 196 10 388 A1 | 9/1997 |
| WO | WO 00/59269 | 10/2000 |
| WO | WO 2004/083900 A2 | 9/2004 |

\* cited by examiner

*Primary Examiner*—David Hung Vu
*Assistant Examiner*—Tung X Le
(74) *Attorney, Agent, or Firm*—William E. Meyer

(57) ABSTRACT

The invention relates to a high-pressure discharge lamp, in particular a vehicle headlight high-pressure discharge lamp, having a lamp base, in whose interior is arranged a starting apparatus for the purpose of starting the gas discharge in the high-pressure discharge lamp and which is provided with an electromagnetic shield, and having a discharge vessel which has an end near to the base and an end remote from the base, a power supply line protruding out of the end, remote from the base, of the discharge vessel being passed back to the lamp base and being electrically coupled to the electromagnetic shield. The electromagnetic shield is preferably connected to the ground reference potential of an operating device of the high-pressure discharge lamp.

11 Claims, 5 Drawing Sheets

Figure 1:
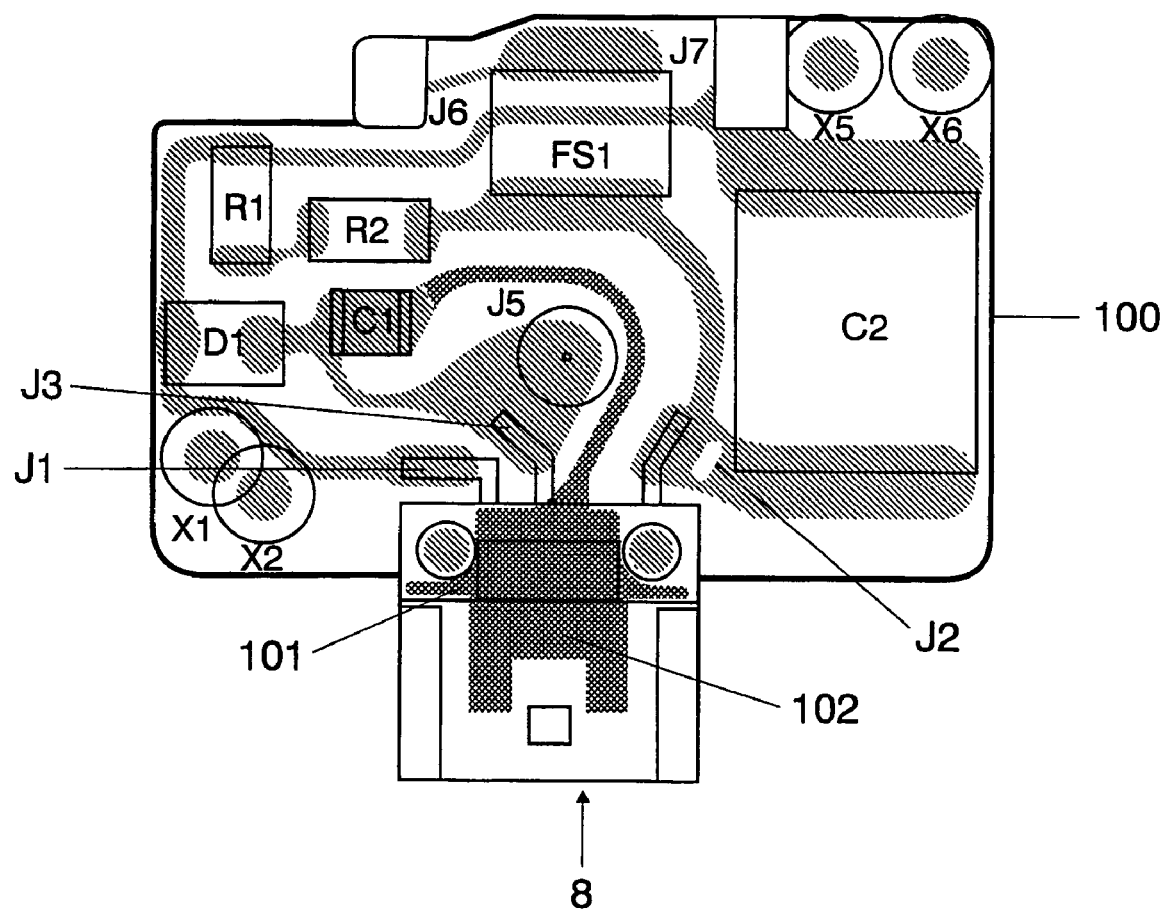

HIGH-PRESSURE DISCHARGE LAMP AND ILLUMINATION APPARATUS HAVING A HIGH-PRESSURE DISCHARGE LAMP

I. TECHNICAL FIELD

The invention relates to a high-pressure discharge lamp having a lamp base, in whose interior is arranged a starting apparatus for the purpose of starting the gas discharge in the high-pressure discharge lamp and which is provided with an electromagnetic shield, and having a discharge vessel which has an end near to the base and an end remote from the base, a power supply line protruding out of the end, remote from the base, of the discharge vessel being passed back to the lamp base.

II. BACKGROUND ART

Such a high-pressure discharge lamp has been disclosed, for example, in WO 00/59269. This laid-open specification describes a high-pressure discharge lamp for a motor vehicle headlight. The high-pressure discharge lamp has a lamp base, in whose interior is arranged a pulse starting apparatus for the purpose of starting the gas discharge in the high-pressure discharge lamp and which is surrounded by a metal housing lying at ground reference potential and acting as an electromagnetic shield. In addition, the high-pressure discharge lamp has a discharge vessel which has an end near to the base and an end remote from the base, a power supply line protruding out of the end remote from the base being passed back to the lamp base.

In order to start the gas discharge in the high-pressure discharge lamp, the power supply line, which is passed out of the end near to the base and is completely closed off by the lamp vessels and the lamp base, has high-voltage pulses of up to 30 kV applied to it by means of the pulse starting apparatus. It has been shown that, during the starting phase, a so-called kickback pulse occurs on the power supply line protruding out of the end, remote from the base, of the discharge vessel, said kickback pulse causing a voltage pulse having an amplitude of approximately 1 kV and a pulse duration of approximately 10 ns at the lamp connection connected to the abovementioned power supply line.

III. DISCLOSURE OF THE INVENTION

One object of the invention is to provide a generic high-pressure discharge lamp which no longer has the abovementioned disadvantage.

The high-pressure discharge lamp according to the invention has a lamp base, in whose interior is arranged a starting apparatus for the purpose of starting the gas discharge in the high-pressure discharge lamp and which is provided with an electromagnetic shield, and has a discharge vessel which has an end near to the base and an end remote from the base, a power supply line protruding out of the end, remote from the base, of the discharge vessel being passed back to the lamp base. According to the invention, the power supply line protruding out of the end, remote from the base, of the discharge vessel is electrically coupled to the electromagnetic shield. As a result, the above-explained kickback pulse is deflected to the electromagnetic shield and it is ensured that the kickback pulse does not cause any notable voltage pulse during the starting phase of the high-pressure discharge lamp at the lamp connection connected to the power supply line protruding out of the end, remote from the base, of the discharge vessel.

The electrical coupling of the power supply line protruding out of the end, remote from the base, of the discharge vessel to the electromagnetic shield is advantageously achieved by creating an electrical link between the abovementioned power supply line and the electromagnetic shield, preferably by means of an electrical network. As a result, the electrical link or contact-making can be carried out completely within the lamp.

The abovementioned electrical network preferably comprises at least one of the components from the group consisting of capacitors and threshold value switches or a combination of the components in this group. In accordance with the particularly preferred exemplary embodiments, the electrical network comprises only a capacitor.

The components of the abovementioned electrical network and preferably also the starting apparatus are mounted on a leadframe in order to make it possible to mount the starting apparatus and the electrical network in the interior of the lamp base in a simple manner. The leadframe also ensures simple electrical coupling between the power supply line protruding out of the end, remote from the base, of the discharge vessel and the electromagnetic shield. For this purpose, the leadframe advantageously has a metallic web, which connects the electrical network to the electromagnetic shield.

The electromagnetic shield is advantageously in the form of a metal housing, which at least partially surrounds the lamp base. The metal housing has an aperture for the discharge vessel or for the lamp vessels and a further aperture for the electrical connection of the high-pressure discharge lamp only on the side facing the discharge vessel, in order to achieve as far-reaching electromagnetic shielding as possible of the starting apparatus accommodated in the lamp base.

The abovementioned metallic web of the leadframe is advantageously designed such that it protrudes out of the interior of the lamp base in the region of the electrical connection of the high-pressure discharge lamp and is in contact with the metal housing. As a result, an electrical contact is produced in a simple manner between the electrical network and the metal housing. The metallic web, in a similar manner to a leaf spring, can bear against the metal housing with a clamping fit.

The high-pressure discharge lamp according to the invention forms an illumination apparatus, together with an operating device which serves the purpose of supplying power to the high-pressure discharge lamp and its starting apparatus accommodated in the lamp base. The electromagnetic shield of the lamp base, i.e. the metal housing, is preferably connected to the ground reference potential of the operating device. The illumination apparatus is, for example, a vehicle headlight. The electromagnetic shield of the lamp base or the metal housing can also be electrically conductively connected to the reflector of the vehicle headlight via a lampholder in order to make use of the reflector, which is then likewise at ground potential, for the electromagnetic shielding of the high-pressure discharge lamp as well.

IV. BRIEF DESCRIPTION OF THE DRAWINGS

Figure 2:
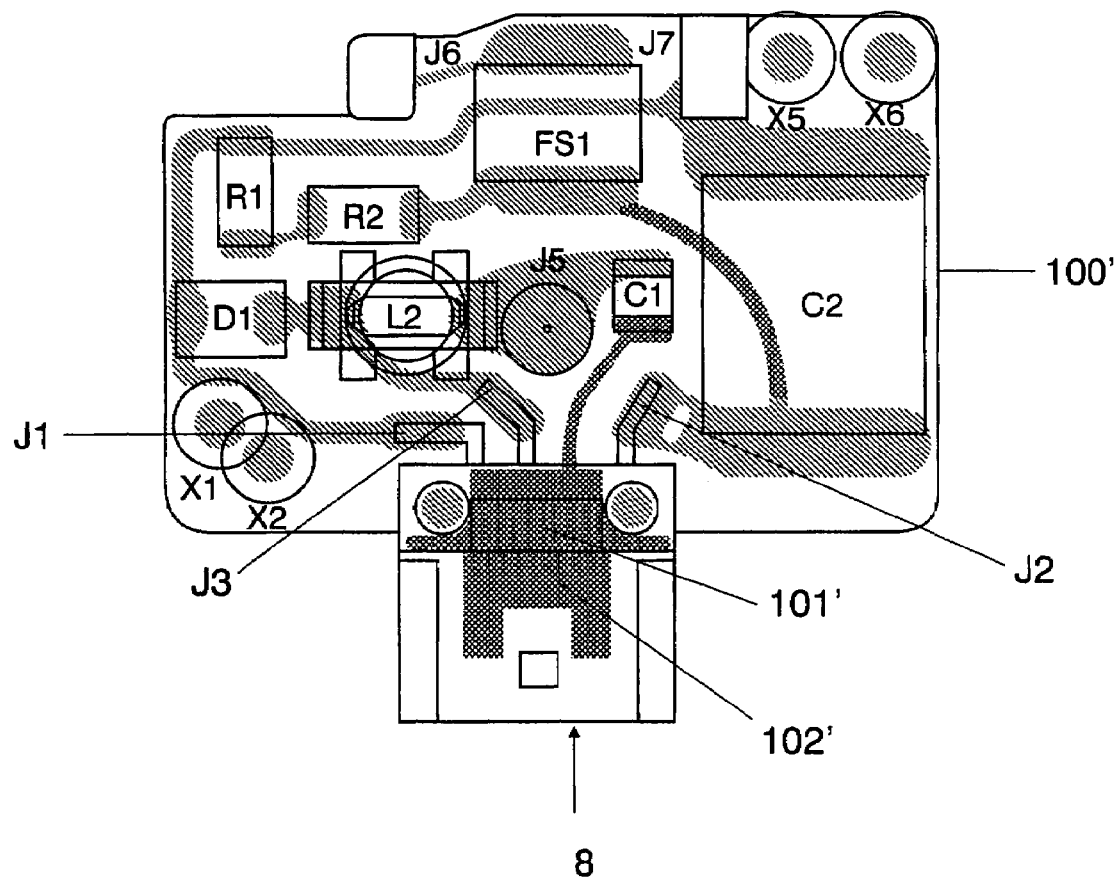
Figure 3:
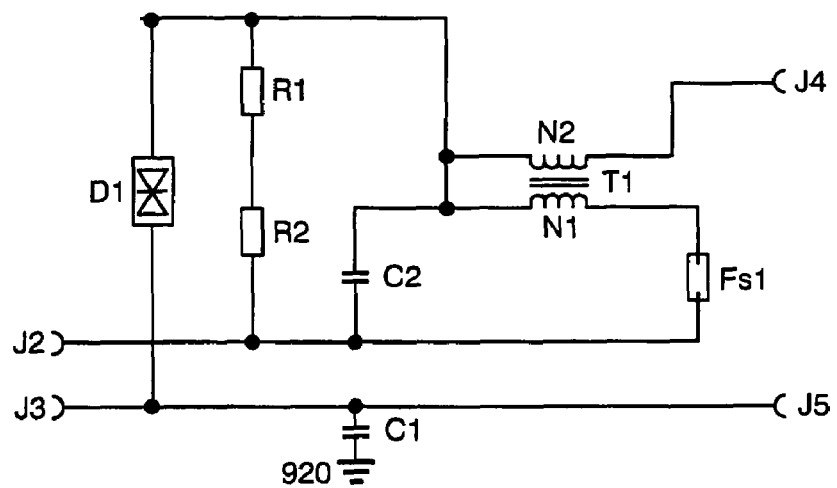
Figure 4:
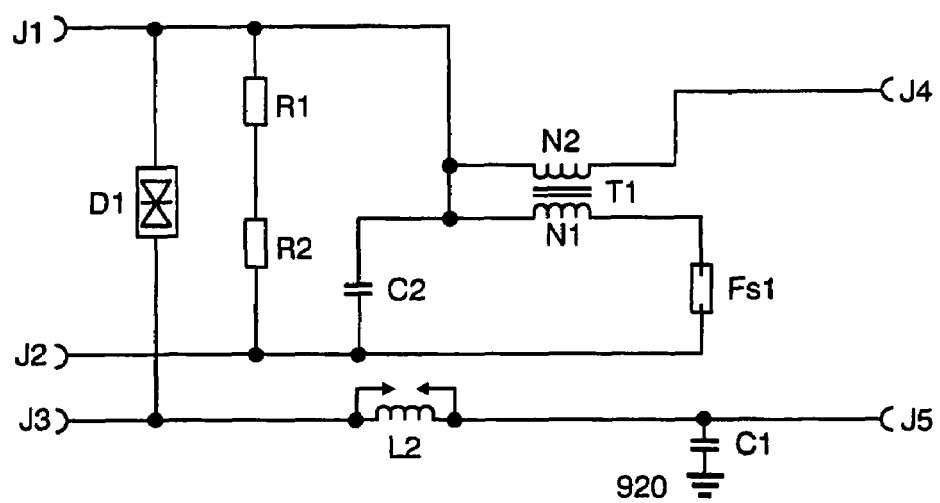
Figure 5:
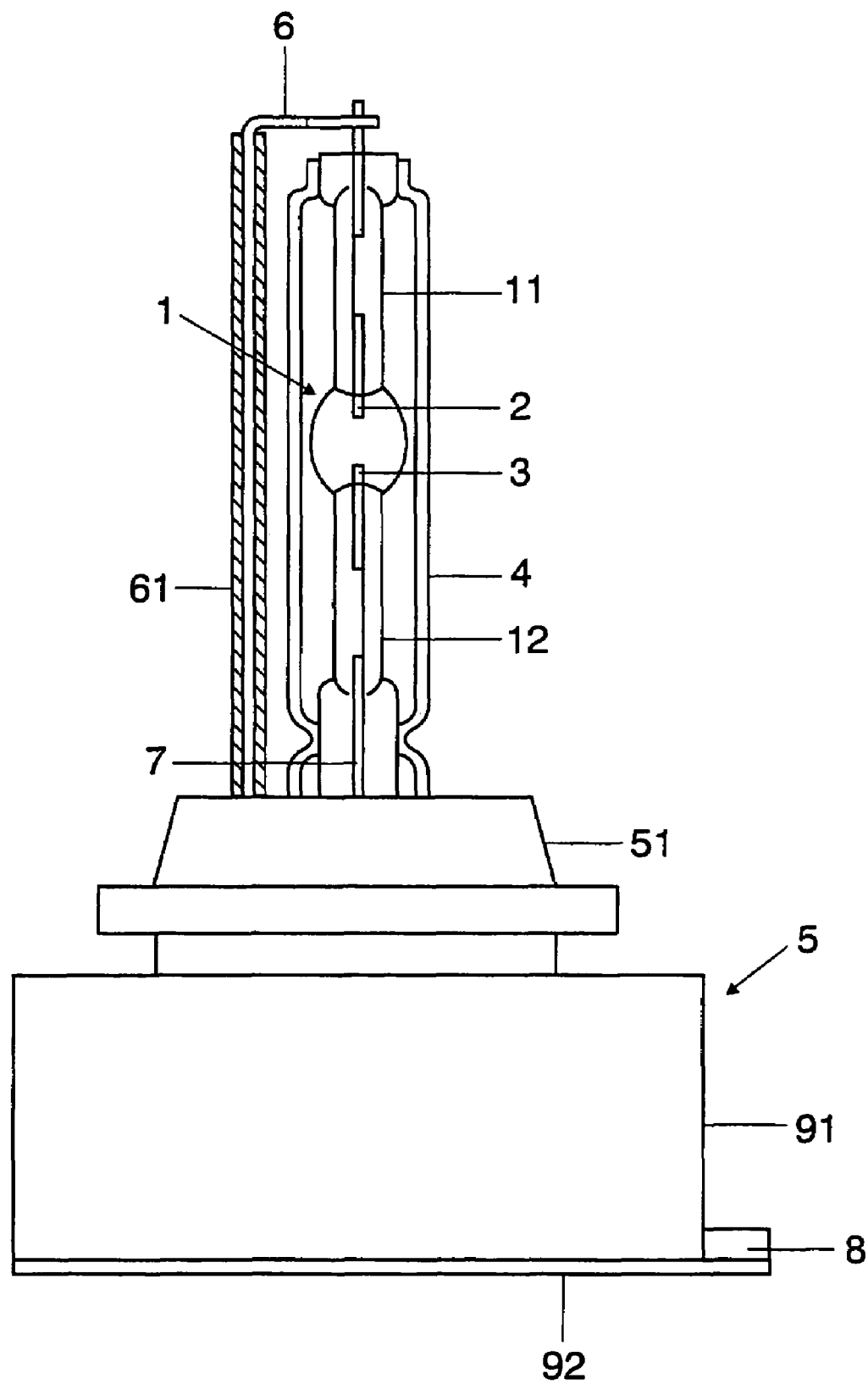
Figure 6:
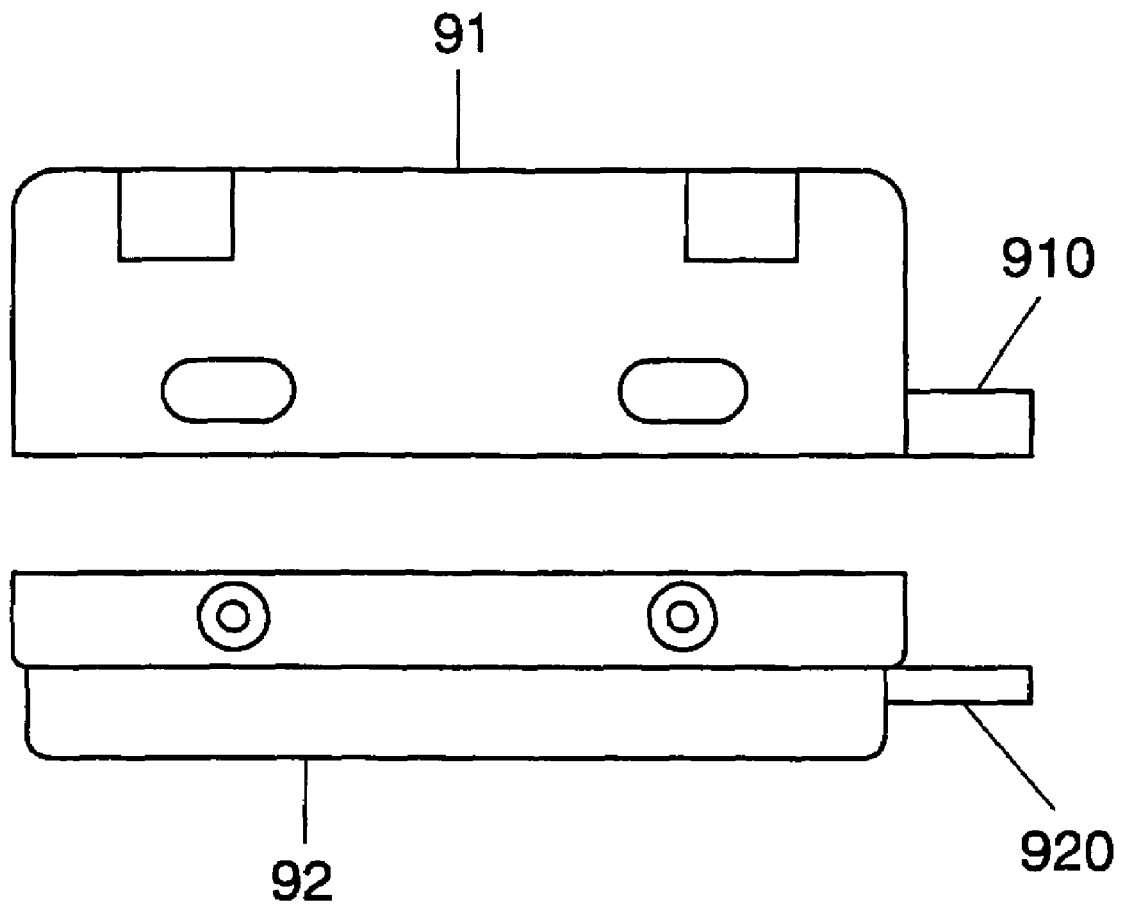

The invention will be explained in more detail below with reference to exemplary embodiments. In the drawing:

FIG. 1 shows a schematic illustration of the leadframe in accordance with the first exemplary embodiment of the starting apparatus depicted in FIG. 3, FIG. 2 shows a schematic illustration of the leadframe in accordance with the second exemplary embodiment of the starting apparatus depicted in FIG. 4, FIG. 3 shows a circuit diagram of the starting apparatus accommodated in the lamp base in accordance with the first exemplary embodiment, FIG. 4 shows a circuit diagram of the starting apparatus accommodated in the lamp base in accordance with the second exemplary embodiment, FIG. 5 shows a side view, in a schematic illustration, of a high-pressure discharge lamp in accordance with the preferred exemplary embodiment of the invention, and FIG. 6 shows a side view of the metal housing of the lamp base of the high-pressure discharge lamp depicted in FIG. 5.

V. BEST MODE FOR CARRYING OUT THE INVENTION

The preferred exemplary embodiment of the invention illustrated in FIG. 5 is a metal-halide high-pressure discharge lamp having an electrical power consumption of approximately 35 watts. This high-pressure discharge lamp is provided as a light source for a motor vehicle headlight. The high-pressure discharge lamp has a discharge vessel 1 made of quartz glass which is sealed at two ends and has two electrodes 2, 3 arranged therein and an ionizable filling, containing metal halides, for the purpose of producing a gas discharge. The discharge vessel 1 is surrounded by a vitreous outer bulb 4. The two lamp vessels 1, 4 are fixed in the upper part 51 of a lamp base 5 made from plastic. Electrical contact is made with the electrode 2 by means of the power supply line 6, which protrudes out of the end 11, remote from the base, of the discharge vessel and is passed back to the lamp base 5, while electrical contact is made with the electrode 3 by means of the power supply line 7, which protrudes out of the end 12, near to the base, of the discharge vessel 1. That section of the power supply line 6 which runs parallel to the lamp vessels 1, 4 is surrounded by an insulating ceramic tube 61. The lamp base 5 has a socket 8, which is in the form of an electrical connection of the high-pressure discharge lamp and is envisaged for connection to a shielded cable, which connects the high-pressure discharge lamp and the starting apparatus, which is accommodated in the interior of the lamp base 5, of the high-pressure discharge lamp to an operating device for the purpose of supplying voltage to the high-pressure discharge lamp and the starting apparatus. Apart from its upper part 51, the lamp base 5 is completely surrounded by a two-part metal housing 91, 92, which serves the purpose of electromagnetically shielding the starting apparatus accommodated in the lamp base 5. Details of the metal housing 91, 92 are illustrated schematically in FIG. 6. The metal housing 91, 92 is preferably made from aluminum or an aluminum/magnesium alloy or from a galvanized steel sheet. It has a lid-like lower part 92 and a hood-like upper part 91 having an aperture for the lamp vessels 1, 4 and for the upper base part 51. The two housing parts 91, 92 have wall regions 920, 910, which also surround the wall of the socket 8 in the mounted state.

FIG. 3 is a schematic illustration of the circuit diagram of the first exemplary embodiment of the starting apparatus accommodated in the interior of the lamp base 5. The starting apparatus is in the form of a pulse starting apparatus and comprises a starting transformer T1 having a primary winding N1 and a secondary winding N2 and a starting capacitor C2, a spark gap FS1, two resistors R1, R2, a suppressor diode D1, the voltage inputs J1, J2, J3 and the connections J4, J5 for the power supply lines 6, 7 of the high-pressure discharge lamp. Of the voltage inputs J1, J2, J3, the connections J1, J2 are used for supplying DC voltage to the starting apparatus, and the connections J1, J3 are used, after completion of the starting phase, to supply voltage to the high-pressure discharge lamp connected to the connections J4, J5 by means of the operating device connected to the socket 8. The connection J4 is connected to the electrode 3 via the power supply line 7, and the connection J5 is connected to the electrode 2 via the power supply line 6. The connection J5 is capacitively coupled to the metal housing 92 of the lamp base 5 via an electrical network, which, in this exemplary embodiment, only comprises the capacitor C1, for example a ceramic capacitor.

During the starting phase of the high-pressure discharge lamp, the starting capacitor C2 is charged with the aid of the operating device (not depicted). If the voltage across the starting capacitor C2 reaches the breakdown voltage of the spark gap FS1, the starting capacitor C2 is discharged, and a current flows via the primary winding N1 of the starting transformer T1, and the spark gap FS1. As a result, high-voltage pulses are induced in the secondary winding N2 of the starting transformer T1 and these high-voltage pulses are supplied to the electrode 3 via the connection J4 and the power supply line 7. These high-voltage pulses, which have an amplitude of up to 30 kV, start the gas discharge between the electrodes 2, 3 in the discharge vessel 1. The abovementioned high-voltage pulses cause a so-called return voltage of up to 1 kV in the circuit illustrated in FIG. 3 and a return voltage of up to 1.8 kV in the circuit illustrated in FIG. 4 at the power supply line 6 and the connection J5, said return voltage being considerably reduced by means of the capacitor C1 and its connection to the metal housing 92 and 920, respectively. The suppressor diode D1 serves the purpose of limiting the voltage at the connections J1, J3. The series circuit comprising the resistors R1, R2 is connected in parallel with the starting capacitor C2 and serves the purpose of discharging the starting capacitor C2 once the starting phase is complete.

FIG. 1 depicts the leadframe 100 for the pulse starting apparatus illustrated in FIG. 3 in accordance with the first exemplary embodiment. The flat leadframe 100 acts as a mounting board for the components of the starting apparatus. It comprises metallic webs (gray areas in FIG. 1), which are embedded in an electrically insulating plastic (black areas in FIG. 1). The components and connections of the starting apparatus shown in FIG. 3 are shown in the illustration of the leadframe 100 in FIG. 1 using white lines and their references. The connections J6, J7 serve the purpose of connecting the starting transformer T1. The references X1, X2, X5, X6 denote apertures in the leadframe 100, which serve the purpose of mounting it in the interior of the lamp base 5. The socket 8 is mounted on the leadframe 100. A metal web 101 extends in the region of the socket 8, said metal web 101 being connected to a connection of the capacitor C1 and being connected at the other end to a wide metallic tongue 102. The wide tongue 102 of the metal web 101 protrudes beyond the leadframe 100 and out of the interior of the lamp base 5 and is arranged in the region of the socket 8. In the mounted state, the metallic tongue 102 of the metal web 101 is in electrical and mechanical contact with the wall part 920 of the metal housing 92 of the lamp base 5, which covers the socket 8.

FIG. 4 is a schematic illustration of the circuit diagram of the second exemplary embodiment of the starting apparatus accommodated in the interior of the lamp base 5. This starting apparatus is largely identical to the starting apparatus of the first exemplary embodiment. The same references have therefore been used in FIGS. 3 and 4 for identical components. In the second exemplary embodiment, the starting apparatus also has a radio interference suppression inductor L2 having a spark gap in air connected in parallel therewith. This parallel circuit comprising the inductor L2 and the spark gap in air is connected into the connection between the connections J3 and J5. The spark gap in air arranged in parallel with the inductor L2 serves the purpose of providing overvoltage protection for the inductor L2. In the second exemplary embodiment, the electrical network for coupling the connection J5 or the power supply line 6 to the metal housing 92 likewise only comprises the capacitor C1. In both exemplary embodiments, the capacitor C1 is in the form of a ceramic capacitor having a capacitance of 500 pF. In the circuit illustrated in FIG. 4, the sequence of the capacitor C1 and the parallel circuit comprising the inductor L2 and the spark gap in air can also be interchanged such that the connection J5 is connected to the capacitor C1 via the inductor L2.

FIG. 2 depicts the leadframe 100' for the pulse starting apparatus illustrated in FIG. 4 in accordance with the second exemplary embodiment. The flat leadframe 100' acts as a mounting board for the components of the starting apparatus in accordance with the second exemplary embodiment. It comprises metallic webs (gray areas in FIG. 1), which are embedded in an electrically insulating plastic (black areas in FIG. 1). The components and connections of the starting apparatus shown in FIG. 4 are shown in the illustration of the leadframe 100' in FIG. 2 using white lines and their references. The leadframe 100' from FIG. 2 is largely identical to the leadframe 100 from FIG. 1. The same references have therefore been used in FIGS. 1 and 2 for identical components. A metal web 101' having a wide tongue 102', which is connected to a connection of the capacitor C1, is arranged in the region of the socket 8. The wide tongue 102' of the metal web 101', which protrudes beyond the leadframe 100' and out of the interior of the lamp base 5, is arranged in the region of the socket 8. In the mounted state, the wide tongue of the metal web 101' is in electrical and mechanical contact with the wall part 920 of the metal housing 92 of the lamp base 5.

The invention is not restricted to the exemplary embodiments explained above in more detail. For example, a suppressor diode having a breakdown voltage of, for example, 200 V may also be used instead of the capacitor C1 in the exemplary embodiments illustrated in FIGS. 3 and 4. The electrical connection between the capacitor C1 and the metal housing 91, 92 may also be provided, instead of the metal tongue 102 or 102', with the aid of an electrically conductive rubber, which rests on the metal web 101 or 101' of the leadframe 100 or 100' and bears against the metal housing 91, 92 through an aperture in the wall of the lamp base 5. The metal webs, having a complex shape, of the leadframe 100 or 100', for example the web between the capacitor C1 and the tongue 102 or 102', may be in the form of deep-drawn parts.

What is claimed is:

1. A high-pressure discharge lamp having a lamp base, in whose interior is arranged a starting apparatus for the purpose of starting the gas discharge in the high-pressure discharge lamp and which is provided with an electromagnetic shield, and having a discharge vessel which has an end near to the base and an end remote from the base, a power supply line protruding out of the end, remote from the base, of the discharge vessel being passed back to the lamp base, wherein the power supply line protruding out of the end, remote from the base, of the discharge vessel is electrically coupled to the electromagnetic shield.

2. The high-pressure discharge lamp as claimed in claim 1, wherein the power supply line protruding out of the end, remote from the base, of the discharge vessel is coupled to the electromagnetic shield by means of an electrical network.

3. The high-pressure discharge lamp as claimed in claim 2, wherein the electrical network comprises at least one capacitor.

4. The high-pressure discharge lamp as claimed in claim 2, wherein the electrical network comprises at least one threshold value switch.

5. The high-pressure discharge lamp as claimed in claim 2, wherein the components of the electrical network are mounted on a leadframe.

6. The high-pressure discharge lamp as claimed in claim 5, wherein the leadframe has a metallic web, which electrically conductively connects the electrical network or the power supply line protruding out of the end, remote from the base, of the discharge vessel to the electromagnetic shield.

7. The high-pressure discharge lamp as claimed in claim 1, wherein the components of the starting apparatus are mounted on a leadframe.

8. The high-pressure discharge lamp as claimed in claim 7, wherein the leadframe has a metallic web, which electrically conductively connects the electrical network or the power supply line protruding out of the end, remote from the base, of the discharge vessel to the electromagnetic shield.

9. The high-pressure discharge lamp as claimed in claims 1, wherein the electromagnetic shield is in the form of a metal housing, which at least partially surrounds the lamp base.

10. The high-pressure discharge lamp as claimed in claim 9, wherein the metallic web is passed out of the interior of the lamp base and is in contact with the metal housing in the region of an electrical connection (8) of the high-pressure discharge lamp.

11. An illumination apparatus, in particular a vehicle headlight, having the high-pressure discharge lamp as claimed in claims 1 and an operating device for the high-pressure discharge lamp, the electromagnetic shield being connected to the ground reference potential of the operating device.

* * * * *